United States Patent Office 2,743,957
Patented May 1, 1956

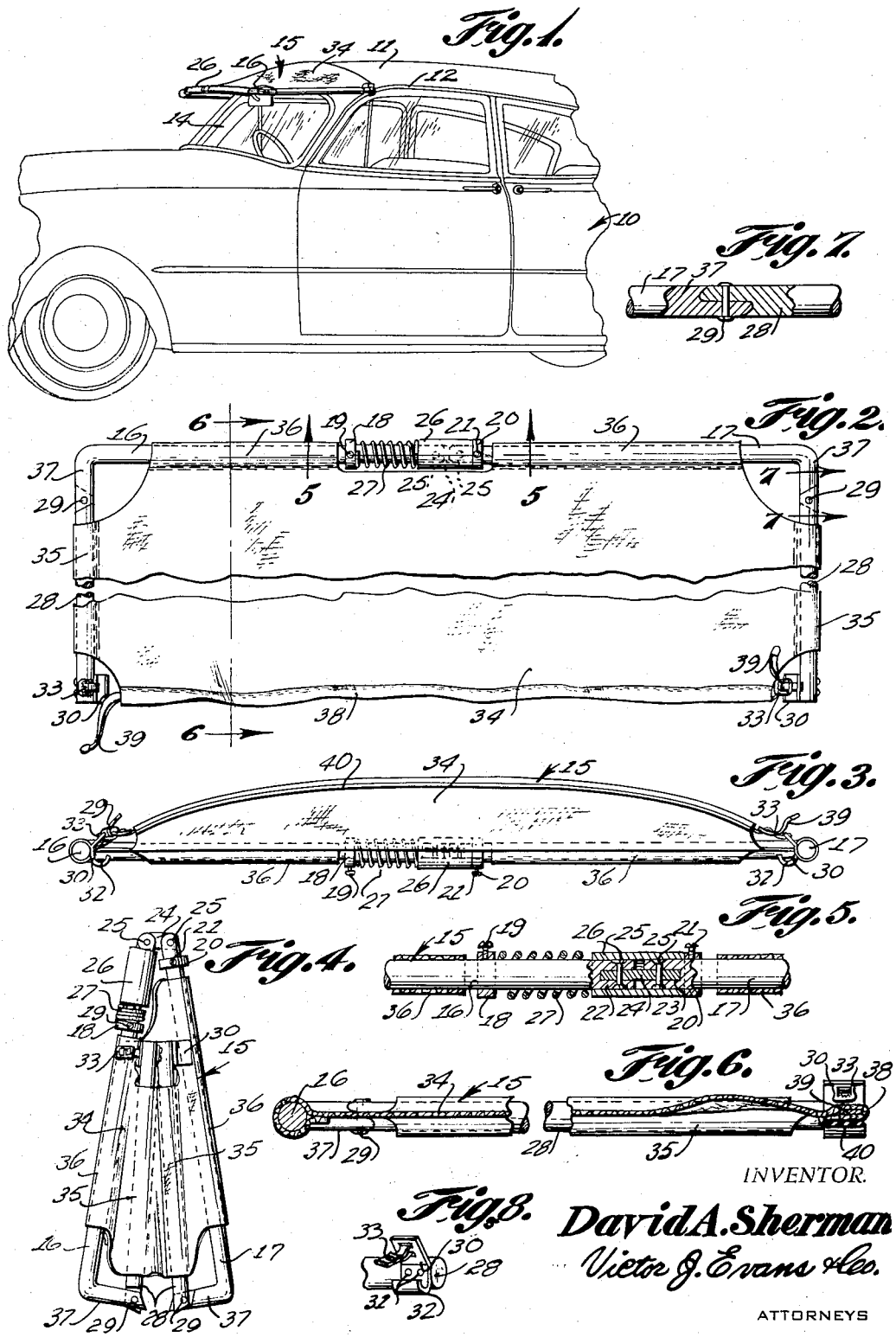

2,743,957

VEHICLE RAIN VISOR

David A. Sherman, Monroe, La.

Application September 3, 1953, Serial No. 378,308

2 Claims. (Cl. 296—95)

This invention relates to a vehicle, and more particularly to a rain visor for attachment to a vehicle.

The object of the invention is to provide a visor for covering the windshield of a vehicle when the vehicle is parked in a suitable location such as a drive-in theater, so that it is not necessary to use the windshield wipers while the car is parked.

Another object of the invention is to provide a rain visor for keeping rain off of the windshield while a vehicle is at a drive-in theater, so that it is not necessary to use windshield wipers, whereby the noise of the engine and obstruction of the wipers will be eliminated.

A further object of the invention is to provide a rain visor which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing the rain visor of the present invention attached to a vehicle.

Figure 2 is a plan view of the rain visor in extended position.

Figure 3 is a rear elevational view of the rain visor.

Figure 4 is a plan view of the rain visor in folded or collapsed position.

Figure 5 is a sectional view taken on the line 5—5 of Figure 2.

Figure 6 is a sectional view taken on the line 6—6 of Figure 2.

Figure 7 is a sectional view taken on the line 7—7 of Figure 2.

Figure 8 is a fragmentary perspective view showing the buckle and clamp for attachment to the gutter of the vehicle.

Referring in detail to the drawings, the numeral 10 designates a conventional vehicle or automobile which includes a top 11, there being the usual rain gutters 12 extending along the upper portion of the vehicle. A windshield 14 is provided, and the present invention is directed to a rain visor 15 which is adapted to be connected to the gutters 12 on the vehicle so that when the vehicle is parked in a drive-in theater the windshield 14 will be protected from the rain without the necessity of using the windshield wipers.

The visor 15 includes a frame that may be made of any suitable material such as tubular metal, and the frame includes a pair of legs 16 and 17, Figure 2. A collar 18 is secured in place on the leg 16 by means of a set screw 19, and a similar collar 20 is secured in place on the leg 17 by means of a set screw 21. The legs 16 and 17 are provided with slots or bifurcated portions 22 and 23 for receiving a link 24. Pins 25 pivotally connect the legs 16 and 17 to the link 24 whereby a pivotal connection is effected between the legs 16 and 17. Slidably mounted on the legs between the collars 18 and 20 is a sleeve 26. A coil spring 27 is circumposed on the leg 16 and is interposed between the collar 18 and the sleeve 26. The coil spring 27 serves to normally bias or urge the sleeve 26 into the position shown in Figure 5 so that accidental folding of the frame is prevented. However, when the visor is not being used, it is only necessary to manually slide the sleeve 26 from right to left as shown in Figure 5 so as to compress the spring 27. Thus, the legs 16 and 17 can be pivoted from the position shown in Figure 5 to the position shown in Figure 4 whereby the visor can be folded to occupy a minimum amount of space when it is not being used.

Pivotally connected to a transverse portion or finger 37 that extends from each of the legs 16 and 17 is an arm 28. The arms 28 are pivotally connected to the fingers 37 by means of pins 29, Figure 7, whereby limited pivotal movement of the parts is permitted. A bracket 30 is secured to the end of each of the arms 28, and the bracket 30 is secured in place by suitable securing elements such as rivets 31. A clamp 32 extends from the bracket 30, and the clamp 32 is adapted to engage the gutter 12 on each side of the vehicle so as to maintain the visor in operative position as shown in Figure 1. A buckle 33 also extends from each of the brackets 30 for a purpose to be later described, Figure 8.

The visor of the present invention further includes a cover 34 which is adapted to be made of a flexible water repellent material. The cover 34 includes pockets 35 and 36 for engagement with or receiving the arms 28 and legs 16 and 17. It will be seen from Figure 3 of the drawings that the rear portion of the cover 34 is wider than the front portion so as to conform or fit the top portion 11 of the vehicle.

The cover 34 is provided with a longitudinally extending pocket or channel 38 which extends along its rear edge, and a strip of tape or a belt 39 extends through the pocket 38. The ends of the belt 39 are adapted to be arranged in engagement with the buckles 33 on each end of the visor. A strip 40 of rubber or other resilient material is secured beneath the rear edge of the cover 34 for engagement with the vehicle so as to provide a water tight seal between the rain visor and the vehicle.

From the foregoing it is apparent that a rain visor has been provided for attachment to a vehicle when the vehicle is parked in a suitable locality such as a drive-in theater. In use the visor is extended as shown in Figures 1, 2, 3 and 5, and then the clamps 32 are arranged in engagement with the gutters 12 of the vehicle, so as to prevent the rain visor from becoming accidentally loosened or disengaged from the vehicle. When the visor is not being used, the sleeve 26 can be moved from the position shown in Figure 5 to the position shown in Figure 4 so that the legs 16 and 17 can be pivoted or moved together. At the same time, the pins 29 permit the arms 28 to be pivoted or folded so that the entire unit can be moved to occupy a small space as shown in Figure 4. Then, the device can be stored in the automobile until it is needed. The visor will keep the rain off the windshield 14 while at a drive-in theater without the use of windshield wipers, and is convenient since it eliminates the necessity of using the engine while the vehicle is parked, and also prevents any obstruction from the windshield wipers. The cover 34 can be made of any suitable water repellent material such as cloth or plastic. The rain visor can be carried in the car when it is not being used, thus for example it can be carried beneath the front seat, or behind the back seat, or in the trunk. The frame can be made of steel rods or other suitable material and the belt 39 slides freely in the hem 38. The cover 34 is wider at the rear than at the front because of the curvature of the top of the automobile. The rubber strip 40 prevents water from running beneath the visor onto the windshield and the visor of the present invention is not to be used while the car is in motion at high speeds.

I claim:

1. A rain visor for attachment to a vehicle when the vehicle is parked in a drive-in theater, comprising a frame including first and second legs each having their adjacent ends bifurcated, a link pivotally connecting said bifurcated ends together, a collar secured to each of said legs, a sleeve slidably mounted on said legs between said collars, a coil spring circumposed on one of said legs and abutting said sleeve, each of said legs extending when attached transversely of the vehicle and including a finger disposed normal thereto, an arm pivotally connected to each of said fingers, a clamp connected to each of said arms for engagement with a gutter of a vehicle, a buckle connected to each of said arms, a flexible cover of water repellent material having hems for receiving said legs and arms, said cover being wider at its rear than at its front for engaging a vehicle, there being a channel arranged in the rear portion of said cover, and a belt extending through said channel and connected to said buckles.

2. The apparatus as described in claim 1, and further including a resilient strip secured to the undersurface of said channel.

References Cited in the file of this patent
UNITED STATES PATENTS

| | | |
|---|---|---|
| 1,662,586 | Newman | Mar. 13, 1928 |
| 2,549,662 | Carpenter | Apr. 17, 1952 |
| 2,620,025 | Powers | Dec. 2, 1952 |
| 2,633,381 | Francis | Mar. 31, 1953 |
| 2,635,615 | Rice | Apr. 21, 1953 |

FOREIGN PATENTS

| | | |
|---|---|---|
| 4,900 | Great Britain | of 1907 |